United States Patent
Liu et al.

(10) Patent No.: US 12,177,890 B2
(45) Date of Patent: Dec. 24, 2024

(54) RANDOM ACCESS METHOD, FIRST COMMUNICATION NODE AND STORAGE MEDIUM

(71) Applicant: ZTE CORPORATION, Shenzhen (CN)

(72) Inventors: Kun Liu, Shenzhen (CN); Bo Dai, Shenzhen (CN); Feng Bi, Shenzhen (CN); Jing Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 342 days.

(21) Appl. No.: 17/764,845

(22) PCT Filed: Sep. 28, 2020

(86) PCT No.: PCT/CN2020/118512
§ 371 (c)(1),
(2) Date: Mar. 29, 2022

(87) PCT Pub. No.: WO2021/063323
PCT Pub. Date: Apr. 8, 2021

(65) Prior Publication Data
US 2022/0353905 A1    Nov. 3, 2022

(30) Foreign Application Priority Data
Sep. 30, 2019   (CN) .......................... 201910944026.4

(51) Int. Cl.
*H04W 72/04*    (2023.01)
*H04W 72/23*    (2023.01)
(Continued)

(52) U.S. Cl.
CPC ......... *H04W 74/002* (2013.01); *H04W 72/23* (2023.01); *H04W 74/0833* (2013.01)

(58) Field of Classification Search
CPC ............... H04W 74/002; H04W 72/23; H04W 74/0833; H04W 56/0045; H04W 74/004;
(Continued)

(56) References Cited

U.S. PATENT DOCUMENTS

2010/0302998 A1* 12/2010  Bao .................... H04L 67/1095
                                                        370/329
2011/0317617 A1   12/2011  Sun et al.
(Continued)

FOREIGN PATENT DOCUMENTS

CN       101389121 A       3/2009
CN       101448325 A       6/2009
(Continued)

OTHER PUBLICATIONS

European Search Report, Application No. 20871694.4, dated Sep. 9, 2023, pp. 1-14.
(Continued)

*Primary Examiner* — Maharishi V Khirodhar
(74) *Attorney, Agent, or Firm* — BOND, SCHOENECK & KING, PLLC; George R. McGuire

(57) ABSTRACT

Provided are a random access method and device, and a first communication node and a second communication node. The random access method is applied to a first communication node and includes the following. First timing advance information and first preamble information corresponding to the first timing advance information are sent to a second communication node.

12 Claims, 8 Drawing Sheets

(51) Int. Cl.
*H04W 74/00* (2009.01)
*H04W 74/0833* (2024.01)
*H04W 76/00* (2018.01)
*H04W 88/04* (2009.01)

(58) Field of Classification Search
CPC ............. H04W 74/006; H04W 74/008; H04W 72/232; H04L 1/1812
USPC ............................................................. 370/329
See application file for complete search history.

(56) References Cited

U.S. PATENT DOCUMENTS

| | | |
|---|---|---|
| 2012/0307716 A1 | 12/2012 | Zhao et al. |
| 2014/0198716 A1 | 7/2014 | Speight et al. |
| 2014/0241235 A1* | 8/2014 | Speight ................. H04W 52/50 370/315 |
| 2015/0029866 A1 | 1/2015 | Liao et al. |
| 2019/0029017 A1* | 1/2019 | Chen ................. H04W 56/0045 |

FOREIGN PATENT DOCUMENTS

| | | |
|---|---|---|
| CN | 104982079 A | 10/2015 |
| CN | 108886673 A | 11/2018 |
| CN | 109729566 A | 5/2019 |
| CN | 110011773 A | 7/2019 |
| CN | 110536474 A | 12/2019 |
| EP | 2217029 A1 | 8/2010 |
| WO | 2012031389 A1 | 3/2012 |

OTHER PUBLICATIONS

International Search Report and Written Opinion—PCT/CN2020/118512, filed Sep. 28, 2020. Mailing date of Search Report Dec. 4, 2020. pp. 1-6.
Translated Chinese First Office Action, App. No. 201910944026.4, dated Apr. 30, 2024, pp. 1-20.
Translated CN Search Report, App. No. 2019109440264, dated Apr. 17, 2024, pp. 1-6.

\* cited by examiner

RANDOM ACCESS METHOD, FIRST COMMUNICATION NODE AND STORAGE MEDIUM

CROSS REFERENCE TO RELATED APPLICATIONS

This is a National Stage Application, filed under 35 U.S.C. 371, of International Patent Application No. PCT/CN2020/118512, filed on Sep. 28, 2020, which claims priority to Chinese Patent Application No. 201910944026.4 filed with the China National Intellectual Property Administration (CNIPA) on Sep. 30, 2019, the disclosures of which are incorporated herein by reference in their entireties.

TECHNICAL FIELD

The present application relates to the field of communication, for example, a random access method a first communication node and storage medium.

BACKGROUND

With the development of intelligent terminals and the enrichment of wireless data application services, the number of data users in wireless communication networks has increased dramatically. Wireless data content is no longer limited to conventional text or images, and more and more content of multimedia services such as high-definition video, mobile television emerges, thus leading to the explosive growth of wireless communication network traffic. The mobile Internet services and the Internet of Things services will become the main driving force for mobile communication development.

For the Internet of Things, the third Generation Partnership Project (3GPP) standard organization has developed two representative communication standard protocols: the Machine Type Communication (MTC) and the Narrow Band Internet of Things (NB-IoT). For the mobile Internet, the 3GPP standard organization has recently developed the 5th Generation (5G) New Radio (NR) communication standard protocol.

For Internet of Things terminals with poor signal quality, it is necessary to increase the transmission power of signals or increase the number of times of repetition transmission of signals to ensure that the transmitted signals can be successfully received. However, these techniques result in increased power consumption of the terminals and increased system resource overheads.

SUMMARY

The present application provides a random access method and device, a first communication node and a second communication node.

Embodiments of the present application provide a random access method. The random access method is applied to a first communication node and includes the following.

First timing advance information and first preamble information corresponding to the first timing advance information are sent to a second communication node.

The embodiments of the present application provide a random access method. The random access method is applied to a second communication node and includes the following.

First timing advance information and first preamble information corresponding to the first timing advance information which are sent by a first communication node are received.

The random access of a third communication node is completed based on the first timing advance information and the first preamble information.

The embodiments of the present application provide a random access method. The random access method is applied to a first communication node and includes the following.

In a case where a Message3 is detected, the Message3 is sent to a second communication node through an uplink channel, where scheduling information of the uplink channel is carried in a Message2 or is sent through a downlink channel.

The embodiments of the present application provide a random access method. The random access method is applied to a second communication node and includes the following.

A Message3 sent by a first communication node is received.

The random access of a third communication node is completed based on the Message3.

The embodiments of the present application provide a random access device. The random access device is configured in a first communication node and includes a sending module. The sending module is configured to send first timing advance information and first preamble information corresponding to the first timing advance information to a second communication node.

The embodiments of the present application provide a random access device. The random access device is configured in a second communication node and includes a reception module and an access module.

The reception module is configured to receive first timing advance information and first preamble information corresponding to the first timing advance information which are sent by a first communication node.

The access module is configured to complete the random access of a third communication node based on the first timing advance information and the first preamble information.

The embodiments of the present application provide a random access device. The random access device is configured in a first communication node and includes a sending module.

The sending module is configured to, in a case where a Message3 is detected, send the Message3 to a second communication node through an uplink channel, where scheduling information of the uplink channel is carried in a Message2 or is sent through a downlink channel.

The embodiments of the present application provide a random access device. The random access device is configured in a second communication node and includes a reception module and an access module.

The reception module is configured to receive a Message3 sent by a first communication node.

The access module is configured to complete the random access of a third communication node based on the Message3.

The embodiments of the present application provide a first communication node. The first communication node includes at least one processor and a storage apparatus configured to store at least one program.

The at least one program, when executed by the at least one processor, causes the at least one processor to implement the preceding methods.

The embodiments of the present application provide a second communication node. The second communication node includes at least one processor and a storage apparatus configured to store at least one program.

The at least one program, when executed by the at least one processor, causes the at least one processor to implement the preceding methods.

The embodiments of the present application provide a storage medium storing computer programs which, when executed by a processor, implement any method in the embodiments of the present application.

DETAILED DESCRIPTION

Embodiments of the present application are described hereinafter in detail in conjunction with the drawings. It is to be noted that if not in collision, the embodiments of the present application and features therein may be combined with each other in any manner.

The steps illustrated in the flowcharts among the drawings may be performed by, for example, a computer system capable of executing a set of computer-executable instructions. Moreover, although logical sequences are illustrated in the flowcharts, the steps illustrated or described may be performed in sequences different from those described here in some cases.

Figure 1:
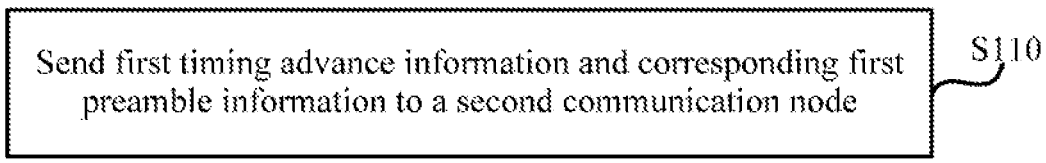
FIG. 1 is a flowchart of a random access method according to an embodiment of the present application.

In an exemplary implementation, FIG. 1 is a flowchart of a random access method according to an embodiment of the present application. The method may be applied to a case of achieving the random access of a third communication node. The method may be executed by a random access device provided in the present application. The random access device may be implemented by software and/or hardware and integrated on a first communication node. The first communication node may be a Relay-Node (RN). In the present application, the transmission on the third communication node side belongs to the transparent transmission.

As shown in FIG. 1, the random access method provided in the present application includes S110.

In S110, first Timing Advance (TA) information and first preamble information corresponding to the first timing advance information are sent to a second communication node.

In the present application, the first communication node may be an RN, the second communication node may be a base station, and the third communication node may be a User Equipment (UE).

The first timing advance information and the first preamble information are used for the third communication node to complete the random access.

It is to be noted that the terms "first", "second", "third" and the like in the application are used for distinction only. For example, the "first" and "second" in first Timing Advance (TA) information and second TA information are only used for distinguishing between TA information. The first TA information may be referred to as TA information sent by the first communication node to the second communication node. The second TA information may be referred to as TA information sent by the second communication node to the first communication node. The second TA information may be included in a Message2.

The first TA information has a correspondence with the first preamble information sent by the third communication node (such as a UE), the first preamble information may be, for example, index information of a preamble and/or information about a time frequency resource occupied by a random access channel for sending a preamble. After the preamble is detected by the RN, the corresponding first TA information may be estimated based on the first preamble information.

The first TA information is obtained by the RN detecting the preamble sent by the UE. The UE uses the first TA information to adjust the timing advance of the UE so as to ensure uplink synchronization of the uplink channel from the UE to the RN.

In the present application, the first TA information and the corresponding first preamble information are sent to the second communication node so as to control the second communication node to complete the random access of the third communication node.

The random access method of the present application may include the following. A preamble sent by the third communication node is detected to obtain the first preamble information. The corresponding first TA information is estimated according to the first preamble information. The first TA information and the corresponding first preamble information are sent to the second communication node, so that the second communication node completes the random access of the third communication node. Exemplarily, the RN is responsible for receiving an Msg3 sent by the UE and sending the Msg3 to the base station. The Msg3 sent by the UE is received by the RN. Before sending the Msg3, the RN may send the first TA information and the corresponding first preamble information to the second communication node.

According to the random access method provided in the present application, the first timing advance information and the corresponding first preamble information are sent to the second communication node, so that the random access of the third communication node is effectively achieved. Particularly for the third communication node with poor signal quality, the random access of the third communication node is achieved without increasing the power consumption of the third communication node, that is, the system resource overhead.

On the basis of the preceding embodiment, variant embodiments of the preceding embodiment are proposed. It is to be noted here that for ease of description, only differences from the preceding embodiment are described in the variant embodiments.

In an embodiment, the first preamble information includes at least one of index information of a preamble or time frequency resource information of a random access channel occupied by a preamble.

The first preamble information may be referred to as identification information of the preamble and is used for distinguishing between preambles. In the embodiment, the preamble may be identified by at least one of index information of the preamble or time frequency resource information of a random access channel occupied by the preamble.

In an embodiment, the method further includes the following.

A Message2 (Msg2) sent by the second communication node is detected, where the Message2 includes second timing advance information and second preamble information corresponding to the second timing advance information. In a case where the Message2 satisfies a first condition, a Message3 sent by the third communication node is detected according to scheduling information of the Message3 indicated by first uplink grant information corresponding to the second preamble information. The first condition includes at least one of the following:

the second preamble information is the same as the first preamble information, or the second timing advance information is the same as the first timing advance information.

The second preamble information includes at least one of index information of a preamble or time frequency resource information of a random access channel occupied by the preamble.

The Msg2 is sent by the base station to the terminal and may also be received by the RN.

The Msg2 may be configured to determine whether to detect the Message3 sent by the third communication node. After the Message3 is detected, the Message3 may be sent to the base station so as to achieve the random access of the third communication node.

The Message3 is detected under at least one of the following conditions: the second preamble information is the first preamble information, or the second TA information is the first TA information.

An uplink grant, that is, the uplink (UL) grant, indicates information related to uplink scheduling. For example, the UL grant includes configuration information about a resource occupied by an uplink channel, a modulation and coding scheme used when data is sent on the uplink channel, etc.

In the present application, the first uplink grant information includes scheduling information for transmission of the Msg3.

The RN may apply to the base station for an uplink (UL) resource to send the Msg3 to the base station. The action of applying for the UL resource may occur after the RN successfully receives the Msg3 of the UE.

In an embodiment, the method further includes the following. In a case where the Message3 has been detected, acknowledgement information or uplink resource request information is sent to the second communication node. The acknowledgement information or the uplink resource request information may be configured to notify the base station that the first communication node has detected the Message3.

In an embodiment, the method further includes the following. Second uplink grant information carried in a downlink control channel sent by the second communication node is received. The Message3 is sent to the second communication node according to an uplink resource indicated by the second uplink grant information.

The RN receives a Physical Downlink Control Channel (PDCCH) sent by the base station, and the second uplink grant information is carried in the physical downlink control channel. The RN sends the Msg3 to the base station according to the uplink resource indicated by the second uplink grant information so as to complete the random access of the third communication node.

In an embodiment, the method further includes the following. Third uplink grant information carried in a downlink control channel sent by the second communication node is received, where the third uplink grant information includes retransmission scheduling information of the Message3 of the third communication node.

The third uplink grant information may be carried in the downlink control channel in a case where the base station does not successfully receive the Message3. The RN receives the PDCCH sent by the base station, the third uplink grant information is carried in the PDCCH, and the third uplink grant information is the retransmission scheduling information of the Msg3 of the third communication node. The RN detects the retransmission information of the Msg3 sent by the third communication node according to the third uplink grant information.

In an embodiment, second indication information is also carried in the downlink control channel, and the second indication information is indication information for indicating detecting the Message3 sent by the third communication node on a resource indicated by the third uplink grant information. In a case where the second indication information exits, the RN detects the retransmission information of the Msg3 sent by the third communication node according to the third uplink grant information.

The base station configures the uplink grant information for the RN to send the Msg3 to the base station, and the sending occasion of the uplink grant information occurs before the RN successfully receives the Msg3 of the UE. The uplink grant information may be directly configured in a Random Access Response (RAR) or sent to the RN through signaling or preconfigured for the RN. If the RN does not successfully receive the Msg3 of the UE, the RN may send negative-acknowledgement indication information to the base station through the uplink grant information, for example, send a negative acknowledgement (NACK) to an Evolved NodeB (eNB), and the eNB may schedule a resource for retransmission of the Msg3 of the UE.

In an embodiment, the method further includes the following. In a case where the Message3 has been detected, the Message3 is sent to the second communication node through an uplink channel, where scheduling information of the uplink channel is carried in the Message2 or is sent through a downlink channel.

The scheduling information of the uplink channel may be referred to as uplink grant information. The downlink channel includes at least one of a PDCCH or system information. The sending occasion of the downlink channel is before the RN receives the Msg3 sent by the third communication node.

In an embodiment, the method further includes one of the operations described below.

Acknowledgement information sent by the second communication node is received; or a downlink control channel carrying downlink grant information is detected.

After the Msg3 is sent to the base station through the uplink channel, one of the operations described below may further be included.

The RN receives the acknowledgement information, that is, the acknowledgement (ACK) information, sent by the base station.

The RN detects the downlink control channel, and the PDCCH carries a downlink (DL) grant.

In a case where it is detected that the downlink grant information, that is, the DL grant, is carried in the PDCCH, it represents that the Msg3 information sent by the RN is successfully received by the base station. The DL grant is scheduling information of a Message4 (Msg4). The downlink grant information may be configured to indicate that the base station successfully receives the Msg3.

In an embodiment, the method further includes the following. In a case where the Message3 is not detected, first indication information is sent to the second communication node, where the first indication information indicates at least one of negative-acknowledgement indication information, that is, NACK information, or retransmission indication information of the Message3.

The NACK information indicates that the RN does not successfully receive the Msg3. In a case where the first indication information indicates the retransmission indication information of the Msg3, it may represent that the base station does not successfully receive the Msg3.

In an embodiment, the method further includes the following. A downlink control channel is detected. In a case where a scrambled Radio Network Temporary Identifier (RNTI) used by downlink control information carried in the downlink control channel is a Temporary Cell-Radio Network Temporary Identifier (TC-RNTI), the Message3 sent by the third communication node is detected on a resource indicated by fourth uplink grant information in the downlink control information.

The TC-RNTI is an RNTI configured in a random access response corresponding to the second preamble information in the Message2.

Figure 2:
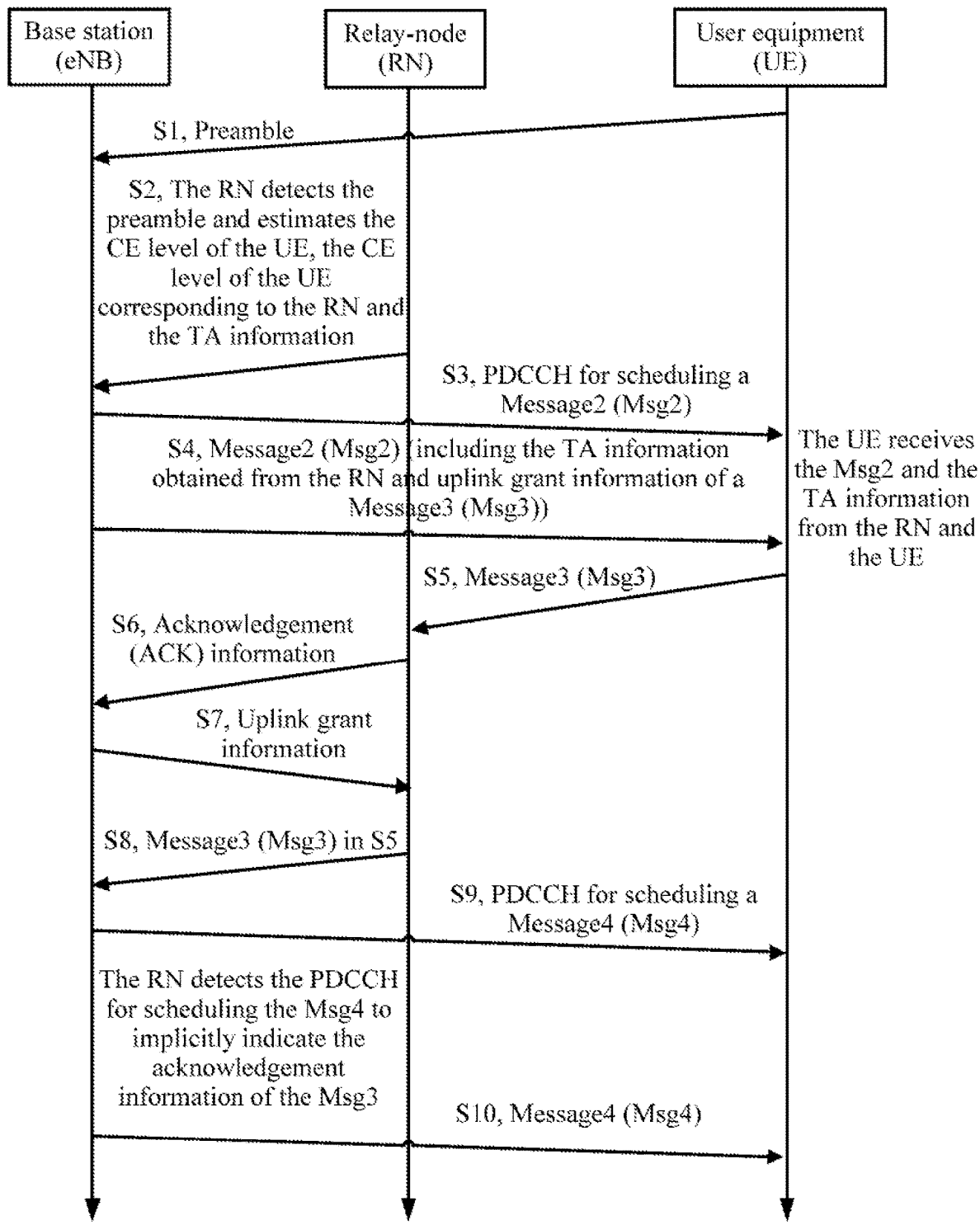
FIG. 2 is a flowchart of a random access procedure of Message3 (Msg3) transmission according to an embodiment of the present application.
Figure 3:
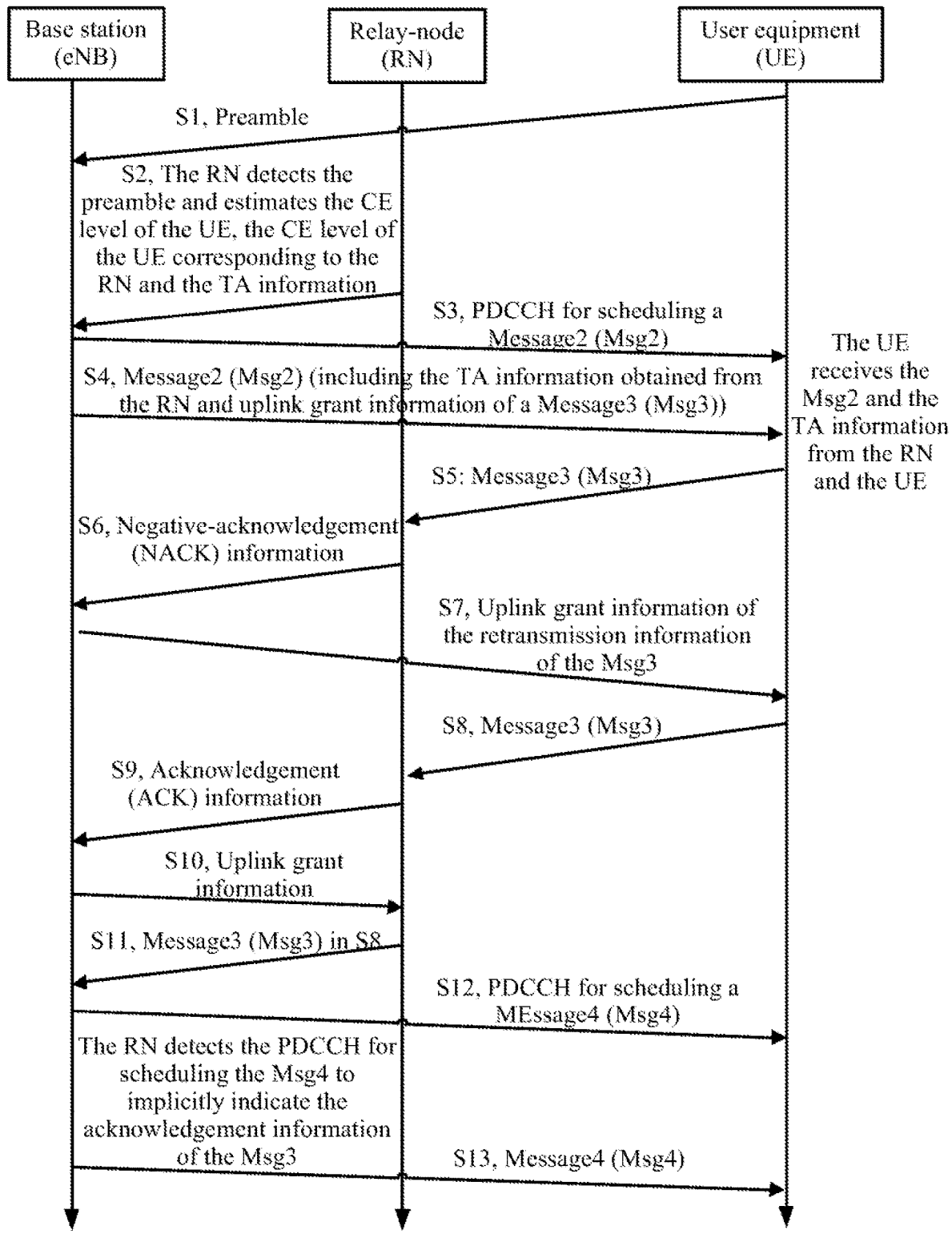
FIG. 3 is a flowchart of a random access procedure of Msg3 retransmission according to an embodiment of the present application.

Exemplarily, FIG. 2 is a flowchart of a random access procedure of Msg3 transmission according to an embodiment of the present application. FIG. 3 is a flowchart of a random access procedure of Msg3 retransmission according to an embodiment of the present application. As shown in FIGS. 2 and 3, the random procedure may be executed by the first communication node (RN), the second communication node (eNB), that is, the base station, and the third communication node (UE).

Index information of a preamble sent by the terminal on a Physical Random Access Channel (PRACH) is 1. The RN and the base station perform preamble detection on the random access channel. The RN sends the detected index information of the preamble and the TA information corresponding to the preamble to the base station. Moreover, the Coverage Enhancement (CE) of the terminal may also be sent to the base station. For example, in a case where the index information of the preamble detected by the RN is 1 and the corresponding TA information is TA1, the RN sends the index information (1) of the preamble and the TA1 to the base station.

Then, the base station sent the TA1 information through the Msg2. In an embodiment, the Msg2 further includes the index information of the preamble corresponding to the TA1. The Msg2 may further include uplink grant information of the Msg3 (that is, the UL grant for Msg3 with smaller repetition), the uplink grant information may include the number of times of repetition transmission of the Msg3, and the number of times of repetition transmission is configured with a small value.

After receiving the Msg2 information, the terminal detects the TA1 corresponding to the index information (1) of the preamble and the UL grant has been detected, the timing advance of the terminal is adjusted according to the TA1, and then the terminal sends the Msg3 on a Physical Uplink Shared Channel (PUSCH) resource indicated by the UL grant.

After receiving the Msg2 information, the RN detects that the Msg2 includes the index information (1) of the preamble and the TA information corresponding to the index information (1) of the preamble is the TA1, and then detects the Msg3 sent by the terminal on the PUSCH resource indicated by the corresponding UL grant.

In an example, in a case where the Msg3 sent by the terminal is detected by the RN, the RN sends uplink channel resource request information to the base station. After responding to the uplink channel resource request information, the base station sends the UL grant on a downlink control channel. After receiving the UL grant, the RN sends the Msg3 to the base station on an uplink channel indicated by the UL grant. After sending the Msg3, the terminal detects the downlink control channel. The downlink control channel carries the DL grant or the UL grant. The DL grant indicates the scheduling information of the Msg4. The UL grant carries the scheduling information of retransmission of the Msg3.

In an example, in a case where the Msg3 sent by the terminal is detected by the RN, the RN sends the Msg3 to the base station through the uplink channel. The scheduling information of the uplink channel, that is, the UL grant, is carried in the Msg2, or the scheduling information (the UL grant) of the uplink channel is carried through the PDCCH. The PDCCH is sent by the base station to the RN, and the sending occasion of the PDCCH is before the occasion when the RN receives the Msg3 sent by the terminal.

After sending the Msg3 to the base station, the RN executes one of the operations described below.

The RN receives ACK information sent by the base station.

The RN detects the downlink control channel, and the PDCCH carries the DL grant.

In a case where it is detected that the PDCCH carries the DL grant, it represents that the Msg3 information sent by the RN is successfully received by the base station. The DL grant is the scheduling information of the Msg4.

The communication system in the embodiments of the present application includes, but is not limited to, the Global System of Mobile communication (GSM), the Code Division Multiple Access (CDMA) system, the Wideband Code Division Multiple Access (WCDMA) system, General Packet Radio Service (GPRS), the Long Term Evolution (LTE) system, the LTE Frequency Division Duplex (FDD) system, the LTE Time Division Duplex (TDD) system, the Universal Mobile Telecommunications System (UMTS), the Worldwide Interoperability for Microwave Access (WiMAX) communication system, the 5G New Radio (NR) system and the like.

Figure 4:
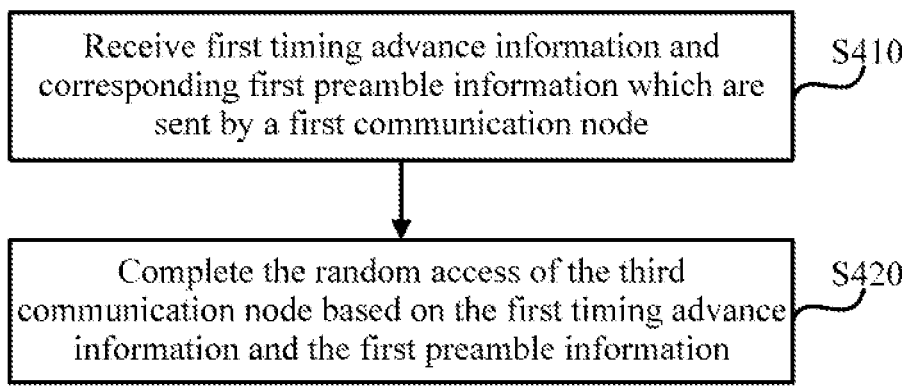
FIG. 4 is a flowchart of another random access method according to an embodiment of the present application.

In an exemplary implementation, the present application further provides a random access method. FIG. 4 is a flowchart of another random access method according to an embodiment of the present application. The method may be applied to a case where a second communication node completes the random access of a third communication node. The method may be executed by a random access device. The random access device may be implemented by software and/or hardware and integrated on the second communication node. The second communication node may be a base station.

As shown in FIG. 4, the random access method provided in the present application includes S410 and S420.

In S410, first timing advance information and first preamble information corresponding to the first timing advance information which are sent by a first communication node are received.

In S420, the random access of the third communication node is completed based on the first timing advance information and the first preamble information.

To implement the random access of the third communication node with poor signal quality, in the present application, the second communication node may receive the first timing advance information and the corresponding first preamble information which are sent by the first communication node.

The process of completing the access is not limited as long as the first TA information and the corresponding first preamble information which are for completing the random access are sent by the first communication node. For the content that is not yet exhaustive in the embodiment, reference may be made to the preceding embodiments, which is not repeated here.

According to the random access method provided in the embodiment of the present application, the first timing advance information and the corresponding first preamble information which are sent by the first communication node are received. The random access of the third communication node is completed based on the first timing advance information and the first preamble information. According to the method, the random access of the third communication node is effectively achieved. Particularly for the third communication node with poor signal quality, the random access of the third communication node is achieved without increasing the power consumption of the third communication node, that is, the system resource overhead.

On the basis of the preceding embodiment, variant embodiments of the preceding embodiments are proposed. It is to be noted here that for ease of description, only differences from the preceding embodiments are described in the variant embodiments.

In an embodiment, the first preamble information includes at least one of index information of a preamble or time frequency resource information of a random access channel occupied by the preamble.

In an embodiment, the method further includes the following.

A Message2 is sent to the first communication node. The Message2 includes second timing advance information and second preamble information corresponding to the second timing advance information.

In a case where the first communication node is controlled to detect a Message3 sent by the third communication node according to scheduling information of the Message3 indicated by first uplink grant information corresponding to the second preamble information, the Message2 satisfies a first condition. The first condition includes at least one of the following:

the second preamble information is the same as the first preamble information, or the second timing advance information is the same as the first timing advance information.

In an embodiment, the method further includes the following.

Acknowledgement information or uplink resource request information sent by the first communication node is received.

In an embodiment, the method further includes the following.

Second uplink grant information carried in a downlink control channel is sent to the first communication node. The second uplink grant information indicates an uplink resource for sending the Msg3 to the first communication node.

In an embodiment, the method further includes the following.

Third uplink grant information carried in a downlink control channel is sent to the first communication node, where the third uplink grant information includes scheduling information about retransmission of the Message3 of the third communication node.

In an embodiment, the downlink control channel further carries second indication information, and the second indication information is indication information for indicating detecting the Message3 sent by the third communication node on a resource indicated by the third uplink grant information.

In an embodiment, the method further includes the following.

The Message3 sent by the first communication node is detected through an uplink channel, where scheduling information of the uplink channel is carried in the Message2 or is sent through a downlink channel.

In an embodiment, the method further includes one of the operations described below.

Acknowledgement information is sent to the first communication node.

Downlink grant information is sent to the first communication node, and the downlink grant information is carried in the downlink control channel.

In an embodiment, the method further includes the following.

First indication information sent by the first communication node is received, where the first indication information indicates at least one of negative-acknowledgement indication information, or retransmission indication information of the Message3. In a case where the first indication information is received, it may represent that the Message3 is not successfully detected by the first communication node.

In an embodiment, the method further includes the following.

In a case where the first communication node is controlled to detect the message3 sent by the third communication node, downlink control information is carried in the downlink control channel. A scrambled Radio Network Temporary Identifier (RNTI) used by the downlink control information is a Temporary Cell-Radio Network Temporary Identifier (TC-RNTI), and a resource indicated by fourth uplink grant information in the downlink control information is a resource for detecting the Message3.

The TC-RNTI is an RNTI configured in a random access response corresponding to the second preamble information in the Message2.

Figure 5:
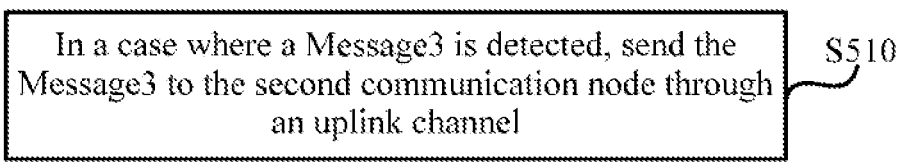
FIG. 5 is a flowchart of another random access method according to an embodiment of the present application.

In an exemplary implementation, an embodiment of the present application further provides a random access method. FIG. 5 is a flowchart of another random access method according to an embodiment of the present application. The method may be applied to a case of achieving the random access of a third communication node. The method may be executed by a random access device provided in the present application. The random access device may be implemented by software and/or hardware and integrated on a first communication node. The first communication node may be a Relay-Node (RN). A second communication node may be a base station, and the third communication node may be a UE.

As shown in FIG. 5, the random access method provided in the present application includes S510.

In S510, in a case where a Message3 has been detected, the Message3 is sent to the second communication node through an uplink channel.

Scheduling information of the uplink channel is carried in a Message2 or is sent through a downlink channel. The downlink channel includes at least one of a PDCCH or system information.

The sending occasion of the downlink channel is before the occasion when the RN receives the Msg3 sent by the terminal.

In the embodiment, the RN is only responsible for forwarding the Msg3 of the UE, while the UE also needs to send the Msg3 to the base station. The resource used by the RN to forward the Msg3 may be the resource for the UE to send the Msg3, or may be a new uplink resource, and the uplink resource needs to be applied for to the base station first. If successfully receiving the Msg3, the RN applies for the uplink resource to the base station.

In an embodiment, when the RN applies for a new uplink resource to forward the Msg3, the base station may only request the RN to retransmit the Msg3 in a case where the Msg3 is not successfully received, and at this time, the UE is unclear and still blindly detects a PDCCH carrying an Msg4. It is to be noted that the premise that only the RN is requested to retransmit the Msg3 is that the RN first successfully receives the Msg3, that is, the RN first sends acknowledgement information of the Msg3 to the base station.

According to the random access method provided in the embodiment of the present application, in a case where the Message3 is detected, the Message3 is sent to the second communication node through the uplink channel, so that the random access of the third communication node is effectively achieved. Particularly for the third communication node with poor signal quality, the random access of the third communication node is achieved without increasing the power consumption of the third communication node, that is, the system resource overhead.

On the basis of the preceding embodiments, variant embodiments of the preceding embodiments are proposed. It is to be noted here that for ease of description, only differences from the preceding embodiments are described in the variant embodiments.

In an embodiment, before detecting the Message3, the following is further included.

A Message2 sent by the second communication node is detected. The Message2 includes third timing advance information and third preamble information corresponding to the third timing advance information.

In a case where the Message2 satisfies a second condition, the Message3 sent by the third communication node is detected according to scheduling information of the Message3 indicated by fifth uplink grant information corresponding to the third preamble information in the Message2. The second condition includes that the third preamble information is fourth preamble information. The fourth preamble information is detected preamble information.

The third preamble information includes at least one of index information of a preamble or time frequency resource information of a random access channel occupied by the preamble.

In an embodiment, an energy value of the fourth preamble information is greater than a first threshold. That is, when the energy value of the preamble detected by the RN is greater than the first threshold, the preamble belongs to the fourth preamble information (that is, the fourth preamble information is the detected preamble information).

The first threshold is configured by the base station or adopts default configuration.

In an embodiment, the method further includes the following.

Sixth uplink grant information is received, where an uplink channel resource indicated by the sixth uplink grant information is used for retransmission of the Message3, and the sixth uplink grant information is sent in a case where the Message3 has not been detected by the second communication node.

In an embodiment, the method further includes the following. In a case where the Message3 has been detected, acknowledgement information is sent to the second communication node. After the Msg3 is successfully detected, the acknowledgement information, that is, the ACK information, is sent to the base station. The ACK information indicates that the Msg3 has been successfully detected by the RN.

Figure 6:
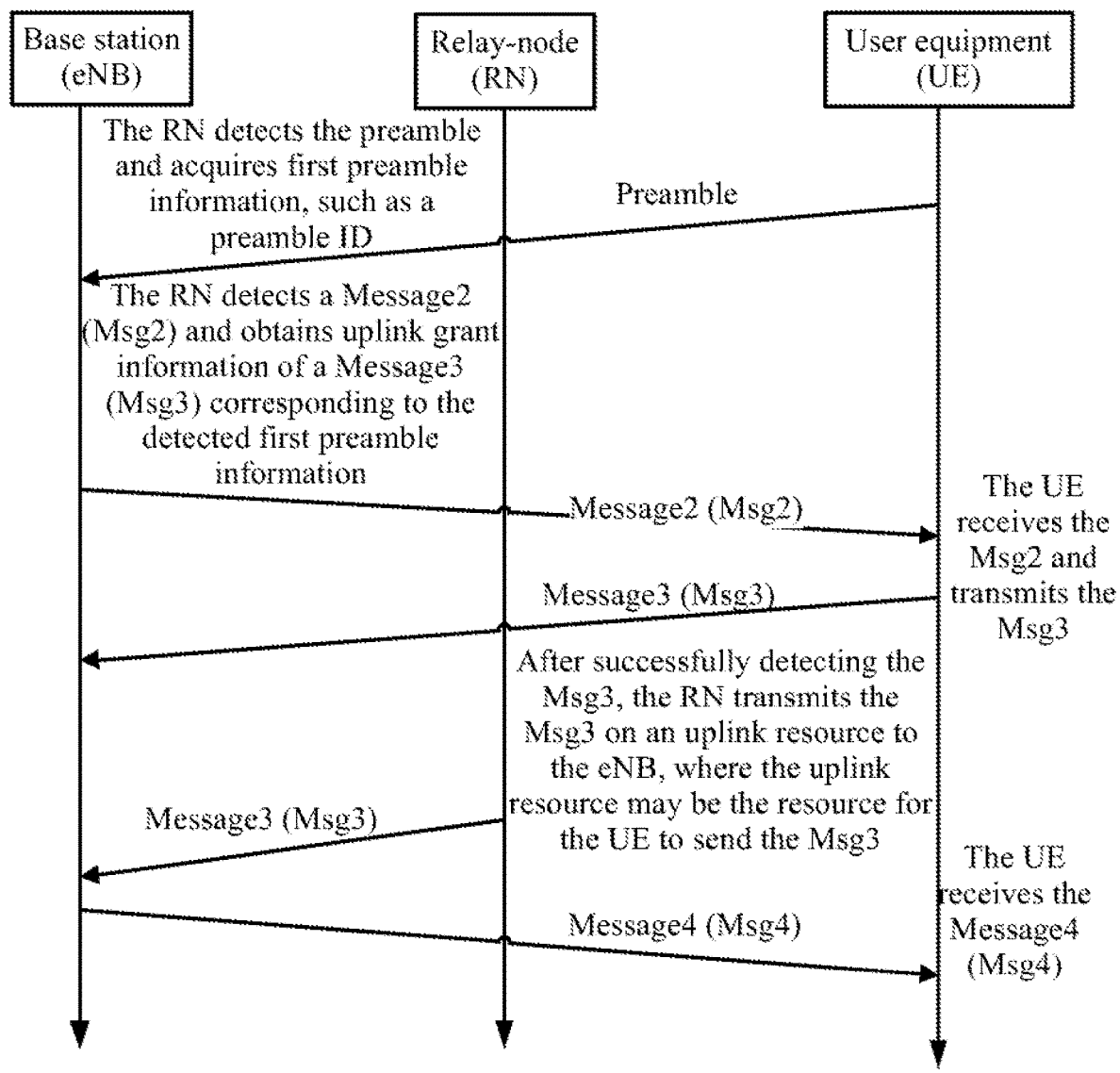
FIG. 6 is a flowchart of another random access method according to an embodiment of the present application.

In an embodiment, FIG. 6 is a flowchart of another random access method according to an embodiment of the present application. Referring to FIG. 6, the first communication node (RN) detects a preamble sent by the third communication node (UE) to obtain first preamble information. In a case where the preamble information is detected by the base station, the base station sends the Message2 (Msg2). The Message2 may be sent to the third communication node, and the first communication node may detect the Message2. The Message2 includes the third timing advance information and the corresponding third preamble information. Scheduling information of an uplink channel, that is, uplink grant information, may be carried in the Message2.

After receiving the Message2, the UE transmits the Message3 to the base station, and the RN may detect the Message3 and send the Message3 to the base station through the uplink channel. For example, the Message3 is sent on an uplink resource, that is, the resource for the UE to send the Message3. After receiving the Message3, the base station sends the Message4 to the UE. The Message4 may indicate that the base station successfully receives the Message3.

Figure 7:
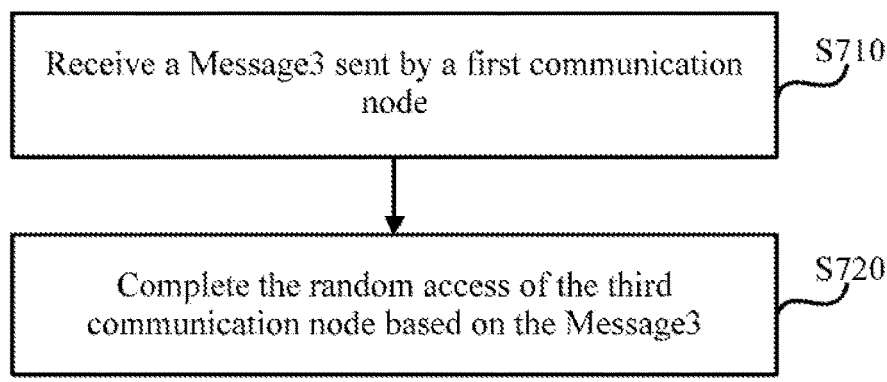
FIG. 7 is a flowchart of another random access method according to an embodiment of the present application.

In an exemplary implementation, the present application further provides a random access method. FIG. 7 is a flowchart of another random access method according to an embodiment of the present application. The method may be applied to a case where a second communication node completes the random access of a third communication node. The method may be executed by a random access device. The random access device may be implemented by software and/or hardware and integrated on the second communication node. The second communication node may be a base station.

As shown in FIG. 7, the random access method provided in the present application includes S710 and S720.

In S710, a Message3 sent by a first communication node is received.

The Message3 in the embodiment may be sent by the first communication node. That is, the forwarding of the Message3 of the third communication node is achieved by the first communication node to complete the random access of the third communication node with poor signal quality.

In S720, the random access of the third communication node is completed based on the Message3.

The manners for completing the random access are not limited here. The base station in the embodiment may also receive the Message3 of the third communication node to complete the random access of the third communication node. For the content that is not yet exhaustive in the embodiment, reference may be made to the preceding embodiments, which is not repeated here.

According to the random access method provided in the present application, the Message3 sent by the first communication node is received, and the random access of the third communication node is completed based on the Message3. According to the method, the random access of the third communication node is effectively achieved. Particularly for the third communication node with poor signal quality, the random access of the third communication node is achieved without increasing the power consumption of the third communication node, that is, the system resource overhead.

On the basis of the preceding embodiments, variant embodiments of the preceding embodiments are proposed. It is to be noted here that for ease of description, only differences from the preceding embodiments are described in the variant embodiments.

In an embodiment, the method further includes the following.

A Message2 is sent, where the Message2 includes third timing advance information and third preamble information corresponding to the third timing advance information. In a case where the first communication node is controlled to detect the Message3 sent by the third communication node according to scheduling information of the Message3 indicated by fifth uplink grant information corresponding to the third preamble information in the Message2, the Message2 satisfies a second condition.

The second condition includes that the third preamble information is fourth preamble information. The fourth preamble information is detected preamble information. The Message2 may be sent to the third communication node, and the first communication node may receive the Message2.

In an embodiment, an energy value of the fourth preamble information is greater than a first threshold.

In an embodiment, the method further includes the following.

In a case where the Msg3 has not been successfully detected, sixth uplink grant information is sent to the first communication node, where an uplink channel resource indicated by the sixth uplink grant information is used for retransmission of the Message3.

In an embodiment, the method further includes the following.

Acknowledgement information sent by the first communication node is received. The acknowledgement information indicates that the Message3 has been successfully detected by the first communication node.

Figure 8:
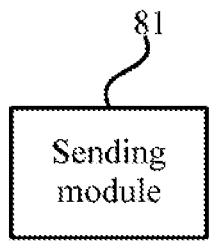
FIG. 8 is a structural diagram of a random access device according to an embodiment of the present application.

In an exemplary implementation, the present application further provides a random access device. FIG. 8 is a structural diagram of a random access device according to an embodiment of the present application. The device provided in the embodiment of the present application may be configured in a first communication node. As shown in FIG. 8, the device includes a sending module 81. The sending module 81 is configured to send first timing advance information and corresponding first preamble information to a second communication node.

The random access device provided in the embodiment is configured to implement the random access method of the embodiments shown in FIG. 1. The random access device provided in the embodiment has similar implementation principles and technical effects to the random access method of the embodiments shown in FIG. 1, which are not repeated here.

On the basis of the preceding embodiment, variant embodiments of the preceding embodiment are proposed. It is to be noted here that for ease of description, only differences from the preceding embodiment are described in the variant embodiments.

In an embodiment, the first preamble information includes at least one of index information of a preamble or time frequency resource information of a random access channel occupied by a preamble.

In an embodiment, the device further includes a Message2 detection module. The Message2 detection module is configured to detect a Message2 sent by the second communication node, where the Message2 includes second timing advance information and corresponding second preamble information. In a case where the Message2 satisfies a first condition, a Message3 sent by a third communication node is detected according to scheduling information of the Message3 indicated by first uplink grant information corresponding to the second preamble information. The first condition includes at least one of the following: the second preamble information is the same as the first preamble information, or the second timing advance information is the same as the first timing advance information.

In an embodiment, the device further includes an acknowledgement sending module. The acknowledgement sending module is configured to, in a case where the Message3 is detected, send acknowledgement information or uplink resource request information to the second communication node.

In an embodiment, the device further includes a reception module and a forwarding module.

The reception module is configured to receive second uplink grant information carried in a downlink control channel sent by the second communication node.

The forwarding module is configured to send the Message3 to the second communication node according to an uplink resource indicated by the second uplink grant information.

In an embodiment, the device further includes a retransmission indication module.

The retransmission indication module is configured to receive third uplink grant information carried in a downlink control channel sent by the second communication node, where the third uplink grant information includes scheduling information about retransmission of the Message3 of the third communication node.

In an embodiment, the downlink control channel further carries second indication information, and the second indication information is indication information for indicating detecting the Message3 sent by the third communication node on a resource indicated by the third uplink grant information.

In an embodiment, the device further includes a retransmission forwarding module.

The retransmission forwarding module is configured to, in a case where the Message3 is detected, send the Message3 to the second communication node through an uplink channel, where scheduling information of the uplink channel is carried in the Message2 or is sent through a downlink channel.

In an embodiment, the device further includes one of an acknowledgement reception module or a downlink grant information detection module.

The acknowledgement reception module is configured to receive acknowledgement information sent by the second communication node.

The downlink grant information detection module is configured to detect a downlink control channel carrying downlink grant information.

In an embodiment, the device further includes a detection failure indication module. The detection failure indication module is configured to, in a case where the Message3 has not been detected, send first indication information to the second communication node, where the first indication information indicates at least one of negative-acknowledgement indication information, or retransmission indication information of the Message3.

In an embodiment, the device further includes a downlink control channel detection module.

The downlink control channel detection module is configured to detect a downlink control channel; and in a case where a scrambled radio network temporary identifier (RNTI) used by downlink control information carried in the downlink control channel is a temporary cell-radio network temporary identifier (TC-RNTI), detect the Message3 sent by the third communication node on a resource indicated by fourth uplink grant information in the downlink control information.

The TC-RNTI is an RNTI configured in a random access response corresponding to the second preamble information in the Message2.

Figure 9:
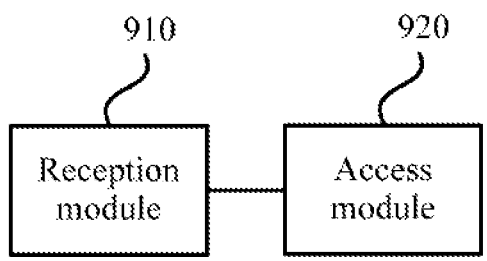
FIG. 9 is a structural diagram of another random access device according to an embodiment of the present application.

The present application further provides a random access device. FIG. 9 is a structural diagram of another random access device according to an embodiment of the present application. The device may be configured in a second communication node. As shown in FIG. 9, the device includes a reception module 910 and an access module 920. The reception module 910 is configured to receive first timing advance information and first preamble information corresponding to the first timing advance information which are sent by a first communication node. The access module 920 is configured to complete the random access of a third communication node based on the first timing advance information and the first preamble information.

The random access device provided in the embodiment is configured to implement the random access method of the embodiments shown in FIG. 4. The random access device provided in the embodiment has similar implementation principles and technical effects to the random access method of the embodiments shown in FIG. 4, which are not repeated here.

On the basis of the preceding embodiment, variant embodiments of the preceding embodiment are proposed. It is to be noted here that for ease of description, only differences from the preceding embodiment are described in the variant embodiments.

In an embodiment, the first preamble information includes at least one of index information of a preamble or time frequency resource information of a random access channel occupied by the preamble.

In an embodiment, the device further includes a Message2 sending module. The Message2 sending module is configured to send a Message2 to the first communication node. The Message2 includes second timing advance information and second preamble information corresponding to the second timing advance information.

In a case where the first communication node is controlled to detect a Message3 sent by the third communication node according to scheduling information of the Message3 indicated by first uplink grant information corresponding to the second preamble information, the Message2 satisfies a first condition. The first condition includes at least one of the following: the second preamble information is the same as the first preamble information, or the second timing advance information is the same as the first timing advance information.

In an embodiment, the device further includes an acknowledgement module.

The acknowledgement module is configured to receive acknowledgement information or uplink resource request information sent by the first communication node.

In an embodiment, the device further includes a second uplink grant information sending module. The second uplink grant information sending module is configured to send second uplink grant information carried in a downlink control channel to the first communication node. The second uplink grant information indicates an uplink resource for sending the Msg3 by the first communication node.

In an embodiment, the device further includes a third uplink grant information sending module. The third uplink grant information sending module is configured to send third uplink grant information carried in a downlink control channel to the first communication node. The third uplink grant information includes scheduling information about retransmission of the Message3 of the third communication node.

In an embodiment, the downlink control channel further carries second indication information, and the second indication information is indication information for indicating detecting the Message3 sent by the third communication node on a resource indicated by the third uplink grant information.

In an embodiment, the device further includes a detection module. The detection module is configured to detect the Message3 sent by the first communication node through an uplink channel, where scheduling information of the uplink channel is carried in the Message2 or is sent through a downlink channel.

In an embodiment, the device further includes one of an acknowledgement information sending module or a downlink grant information sending module.

The acknowledgement information sending module is configured to send acknowledgement information to the first communication node.

The downlink grant information sending module is configured to send downlink grant information to the first communication node, and the downlink grant information is carried in a downlink control channel.

In an embodiment, the device further includes a retransmission indication module. The retransmission indication module is configured to receive first indication information sent by the first communication node, where the first indication information indicates at least one of negative-acknowledgement indication information, or retransmission indication information of the Message3. In a case where the first indication information is received, it may represent that the Message3 has not been successfully detected by the first communication node.

In an embodiment, the device further includes a downlink control information sending module. The downlink control information sending module is configured to, in a case where the first communication node is controlled to detect the Message3 sent by the third communication node, carry downlink control information in a downlink control channel. A scrambled Radio Network Temporary Identifier (RNTI) used by the downlink control information is a Temporary Cell-Radio Network Temporary Identifier (TC-RNTI), and a resource indicated by fourth uplink grant information in the downlink control information is a resource for detecting the Message3.

The TC-RNTI is an RNTI configured in a random access response corresponding to the second preamble information in the Message2.

Figure 10:
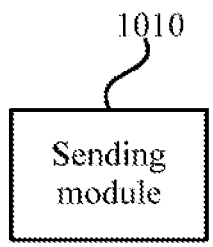
FIG. 10 is a structural diagram of another random access device according to an embodiment of the present application.

The present application further provides a random access device. FIG. 10 is a structural diagram of another random access device according to an embodiment of the present application. The device provided in the embodiment of the present application may be configured in a first communication node. As shown in FIG. 10, the device includes a sending module 1010. The sending module 1010 is configured to in a case where a Message3 has been detected, send the Message3 to a second communication node through an uplink channel, where scheduling information of the uplink channel is carried in a Message2 or is sent through a downlink channel.

The random access device provided in the embodiment is configured to implement the random access method of the embodiments shown in FIG. 5. The random access device provided in the embodiment has similar implementation principles and technical effects to the random access method of the embodiments shown in FIG. 5, which are not repeated here.

On the basis of the preceding embodiment, variant embodiments of the preceding embodiment are proposed. It is to be noted here that for ease of description, only differences from the preceding embodiment are described in the variant embodiments.

In an embodiment, the device further includes a detection module. The detection module is configured to, before detecting the Message3, detect the Message2 sent by the second communication node, where the Message2 includes third timing advance information and third preamble information corresponding to the third timing advance information; and in a case where the Message2 satisfies a second condition, the detection module is configured to detect the Message3 sent by a third communication node according to scheduling information of the Message3 indicated by fifth uplink grant information corresponding to the third preamble information in the Message2, where the second condition includes that the third preamble information is fourth preamble information, where the fourth preamble information is detected preamble information.

In an embodiment, an energy value of the fourth preamble information is greater than a first threshold.

In an embodiment, the device further includes a reception module. The reception module is configured to receive sixth uplink grant information, where an uplink channel resource indicated by the sixth uplink grant information is configured to retransmit the Message3, and the sixth uplink grant information is sent in a case where the Message3 has not been detected by the second communication node.

In an embodiment, the device further includes an acknowledgement module. The acknowledgement module is configured to, in a case where the Message3 is detected, send acknowledgement information to the second communication node.

Figure 11:
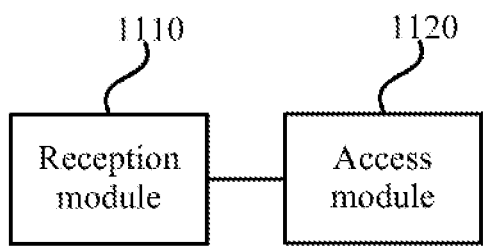
FIG. 11 is a structural diagram of another random access device according to an embodiment of the present application.

The present application provides a random access device. FIG. 11 is a structural diagram of another random access device according to an embodiment of the present application. The device may be configured in a second communication node. As shown in FIG. 11, the device includes a reception module 1110 and an access module 1120. The reception module 1110 is configured to receive a Message3 sent by a first communication node.

The access module 1120 is configured to complete the random access of a third communication node based on the Message3.

The random access device provided in the embodiment is configured to implement the random access method of the embodiments shown in FIG. 7. The random access device provided in the embodiment has similar implementation principles and technical effects to the random access method of the embodiments shown in FIG. 7, which are not repeated here.

On the basis of the preceding embodiment, variant embodiments of the preceding embodiment are proposed. It is to be noted here that for ease of description, only differences from the preceding embodiment are described in the variant embodiments.

In an embodiment, the device further includes a Message2 sending module. The Message2 sending module is configured to send a Message2, where the Message2 includes third timing advance information and third preamble information corresponding to the third timing advance information. In a case where the first communication node is controlled to detect the Message3 sent by the third communication node according to scheduling information of the Message3 indicated by fifth uplink grant information corresponding to the third preamble information in the Message2, the Message2 satisfies a second condition.

The second condition includes that the third preamble information is fourth preamble information. The fourth preamble information is detected preamble information. The Message2 may be sent to the third communication node, and the first communication node may receive the Message2.

In an embodiment, an energy value of the fourth preamble information is greater than a first threshold.

In an embodiment, the device further includes a sixth uplink grant information sending module. The sixth uplink grant information sending module is configured to, in a case where the Msg3 is not successfully detected, send sixth uplink grant information to the first communication node, where an uplink channel resource indicated by the sixth uplink grant information is configured to retransmit the Message3.

In an embodiment, the device further includes an acknowledgement module. The acknowledgement module is configured to receive acknowledgement information sent by the first communication node. The acknowledgement information indicates that the Message3 has been successfully detected by the first communication node.

The present application further provides a downlink message sending method. The method is applied to a first communication node, such as an RN. The method includes the following.

In a case where a downlink message sent by a second communication node is detected and the downlink message satisfies a third condition, the downlink message is sent to a third communication node.

The RN may be responsible for forwarding the downlink message, such as an Msg2, an Msg4 and a PDCCH, while a base station also continues to send the preceding message to the terminal.

According to the downlink information sending method provided in the embodiment, in a case where the downlink message sent by the second communication node is detected and the downlink message satisfies the third condition, the downlink message is sent to the third communication node, so that the forwarding of the downlink message can be achieved through the first communication node, such as the forwarding of the downlink message sent by the second communication node to the third communication node.

In a case where the third condition is satisfied, the RN may achieve the forwarding of the downlink message, and the third condition is not limited here.

On the basis of the preceding embodiments, variant embodiments of the preceding embodiments are proposed. It is to be noted here that for ease of description, only differences from the preceding embodiments are described in the variant embodiments.

In an embodiment, the downlink message includes at least one of a scheduling message of the Message2 carried in downlink control information, a scheduling message of the Message4 carried in downlink control information, the Message2, or the Message4.

In an embodiment, the third condition includes at least one of the following:
in a case where the downlink message is the Message2, and the Message2 includes fifth preamble information, where the fifth preamble information is detected preamble information, an energy threshold of the fifth preamble information is greater than a first threshold;
in a case where the downlink message is the scheduling message of the Message4 carried in the downlink control information, the downlink control information is scrambled by using a temporary cell-radio network temporary identifier, preamble information corresponding to a random access response carrying the temporary cell-radio network temporary identifier is detected preamble information, and an energy threshold of the corresponding preamble information is greater than a first threshold; or
in a case where the downlink message is the Message4, preamble information corresponding to a random access response of a temporary cell-radio network temporary identifier used for scrambling the downlink control information carrying the scheduling information of the Message4 is detected preamble information, and an energy threshold of the corresponding preamble information is greater than a first threshold.

In an embodiment, the resource for sending the downlink message is configured in system information or through a downlink control channel.

The preamble information in the present application, such as the fifth preamble information, the fourth preamble information, the third preamble information, the second preamble information, the first preamble information and the preamble information corresponding to the random access response, includes at least one of index information of a preamble or time frequency resource information of a random access channel occupied by a preamble.

Figure 11A:
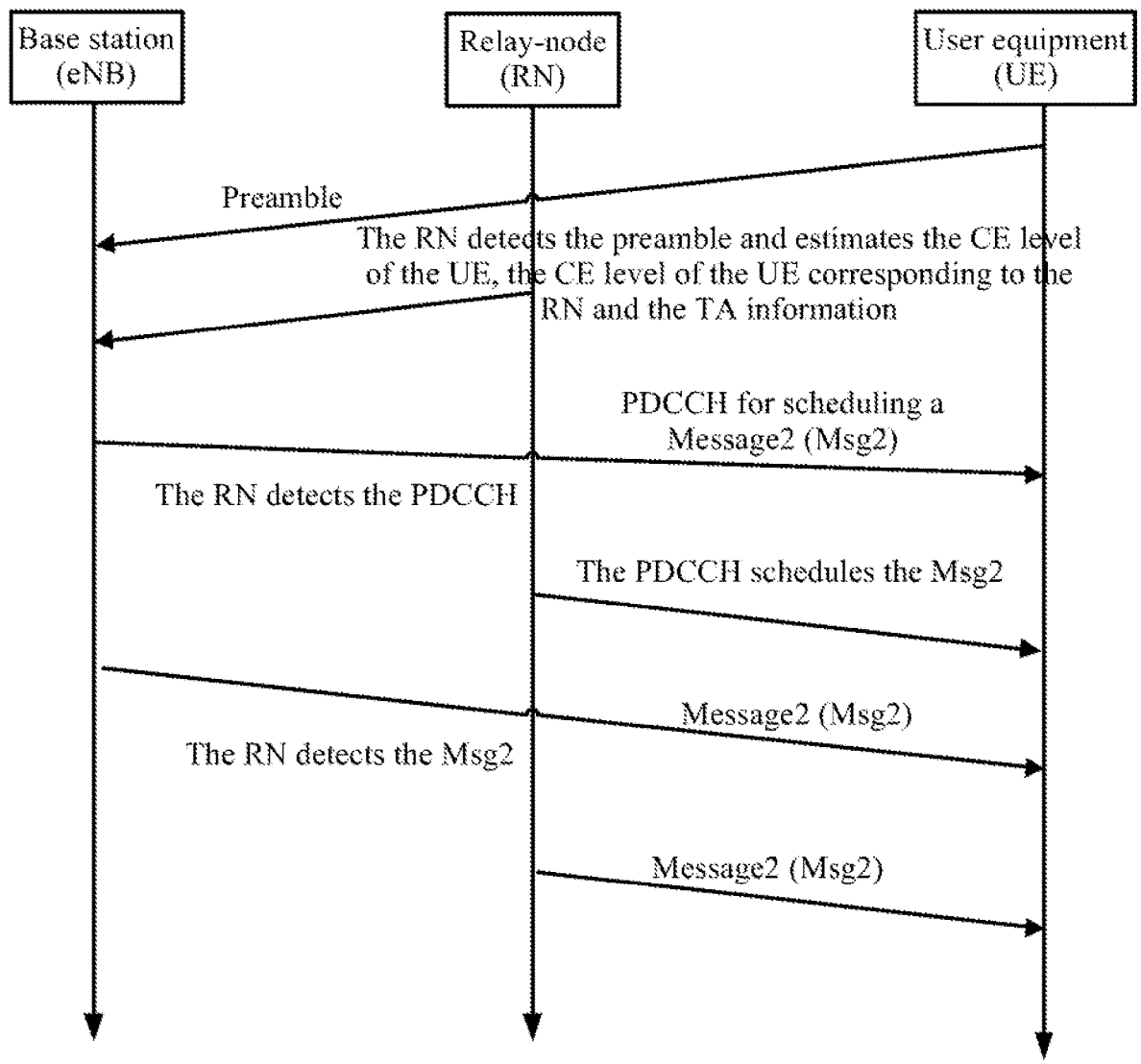
FIG. 11A is a diagram of the sending flow of downlink information according to an embodiment of the present application.

FIG. 11A is a diagram of the sending flow of downlink information according to an embodiment of the present application. As shown in FIG. 11A, the first communication node (RN) forwards the Msg2 and the Msg4 to the third communication node (UE).

The present application further provides a downlink message sending device. The downlink message sending device is integrated on the first communication node, such as the RN, and includes a sending module.

The sending module is configured to, in a case of detecting a downlink message sent by the second communication node and the downlink message satisfying the third condition, send the downlink message to the third communication node.

The downlink message sending device provided in the embodiment is configured to implement the downlink message sending method of the embodiments of the present application. The downlink message sending device provided in the embodiment has similar implementation principles and technical effects to the downlink message sending method of the embodiment of the present application, which are repeated here.

On the basis of the preceding embodiment, variant embodiments of the preceding embodiment are proposed. It is to be noted here that for ease of description, only differences from the preceding embodiment are described in the variant embodiments.

In an embodiment, the downlink message includes at least one of: a scheduling message of the Message2 carried in downlink control information, a scheduling message of the Message4 carried in downlink control information, the Message2 or the Message4.

In an embodiment, the third condition includes at least one of the following:
in a case where the downlink message is the Message2, and the Message2 includes the fifth preamble information, where the fifth preamble information is detected preamble information;
in a case where the downlink message is the scheduling message of the Message4 carried in the downlink control information, the downlink control information is scrambled by using a temporary cell-radio network temporary identifier, and preamble information corresponding to a random access response carrying the temporary cell-radio network temporary identifier is detected preamble information; or
in a case where the downlink message is the Message4, preamble information corresponding to a random access response of a temporary cell-radio network temporary identifier used for scrambling the downlink control information carrying the scheduling information of the Message4 is detected preamble information.

In an embodiment, the resource used for sending the downlink message is configured in system information or through a downlink control channel.

The present application provides a first communication node. The first communication node includes at least one processor and a storage apparatus configured to store at least one program.

The at least one program, when executed by the at least one processor, causes the at least one processor to implement the downlink message sending method provided in the present application.

Figure 12:
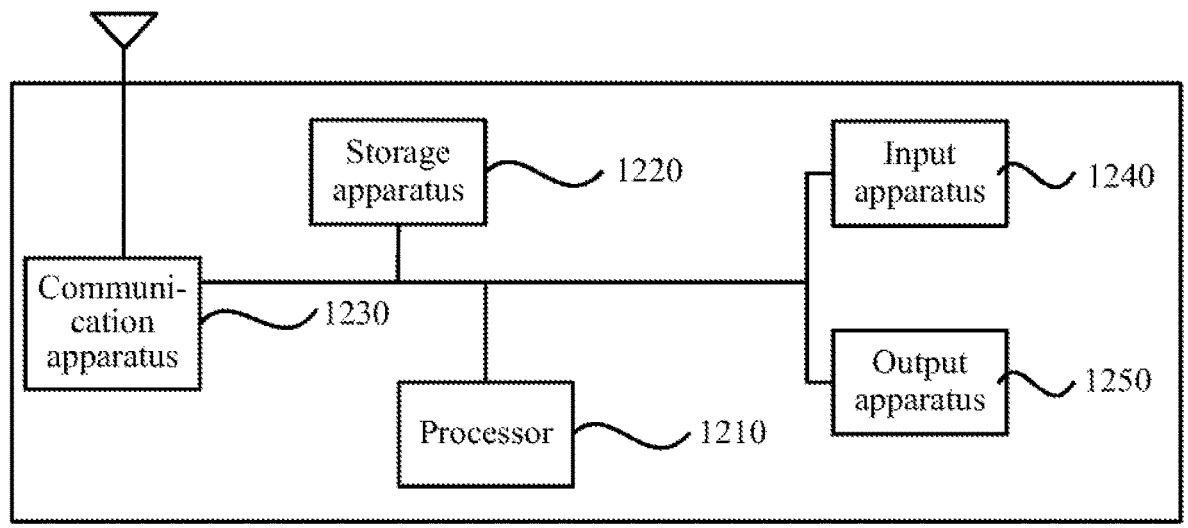
FIG. 12 is a structural diagram of a first communication node according to an embodiment of the present application.

The present application provides a first communication node. FIG. 12 is a structural diagram of a first communication node according to an embodiment of the present application. As shown in FIG. 12, the first communication node provided in the present application includes at least one processor 1210 and a storage apparatus 1220. One or more processors 1210 may be provided in the first communication node. In FIG. 12, one processor 1210 is taken as an example. The storage apparatus 1220 is configured to store at least one program. The at least one program, when executed by the at least one processor 1210, causes the at least one processor 1210 to implement the method described in FIG. 1 or FIG. 5 or the downlink message sending method in the embodiments of the present application.

The first communication node may further include a communication apparatus 1230, an input apparatus 1240 and an output apparatus 1250.

The processor 1210, the storage apparatus 1220, the communication apparatus 1230, the input apparatus 1240 and the output apparatus 1250 in the first communication node may be connected via a bus or other means, with connection via a bus as an example in FIG. 12.

The input apparatus 1240 may be configured to receive input digital or character information and to generate key signal input related to user settings and function control of the first communication node. The output apparatus 1250 may include a display screen and other display devices.

The communication apparatus 1230 may include a receiver and a transmitter. The communication apparatus 1230 is configured to perform information transceiving and communication under the control of the processor 1210. For example, sending of first timing advance information and corresponding first preamble information or sending of a Message3 or a downlink message is performed.

As a computer-readable storage medium, the storage apparatus 1220 may be configured to store software programs, computer-executable programs and modules, such as program instructions/modules (for example, a sending module 81 in the random access device or a sending module 1010 in the random access device) corresponding to the method of the embodiments of the present application. The storage apparatus 1220 may include a program storage area and a data storage area. The program storage area may store an operating system and an application program required by at least one function. The data storage area may store data created depending on use of the first communication node. Additionally, the storage apparatus 1220 may include a high-speed random-access memory and may further include a nonvolatile memory, such as at least one magnetic disk memory, a flash memory or another nonvolatile solid-state memory. In some examples, the storage apparatus 1220 may include memories which are remotely disposed with respect to the processor 1210. These remote memories may be connected to the first communication node via a network. Examples of the preceding network include, but are not limited to, the Internet, an intranet, a local area network, a mobile communication network and a combination thereof.

Figure 13:
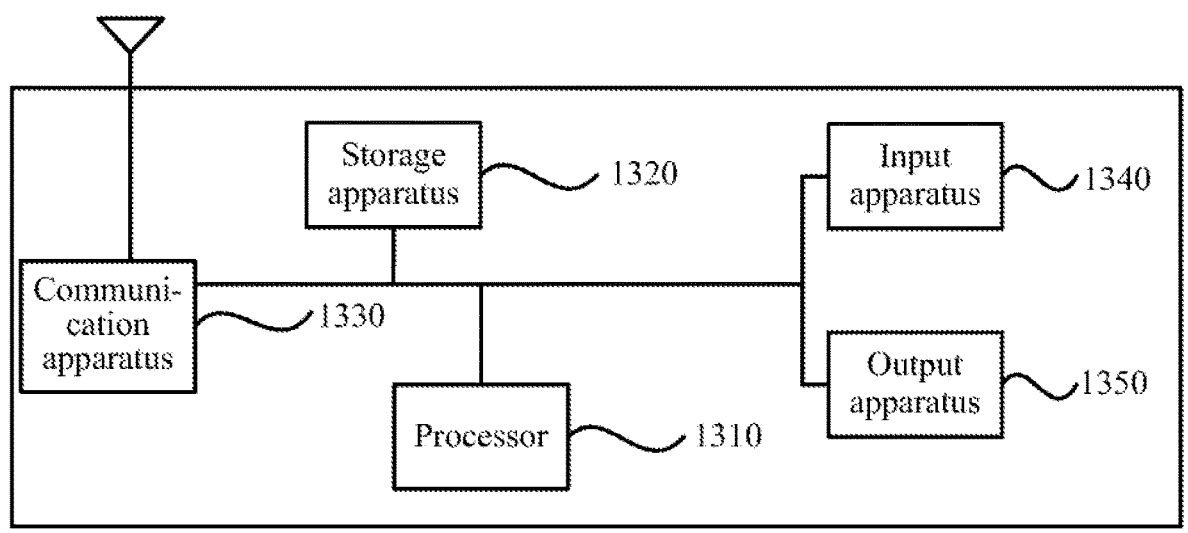
FIG. 13 is a structural diagram of a second communication node according to an embodiment of the present application.

The present application provides a second communication node. FIG. 13 is a structural diagram of a second communication node according to an embodiment of the present application. As shown in FIG. 13, the second communication node provided in the present application includes at least one processor 1310 and a storage apparatus 1320. One or more processors 1310 may be provided in the second communication node. In FIG. 13, one processor 1310 is taken as an example. The storage apparatus 1320 is configured to store at least one program. The at least one program, when executed by the at least one processor 1310, causes the at least one processor 1310 to implement the method described in FIG. 4 or FIG. 7 in the embodiments of the present application.

The second communication node may further include a communication apparatus 1330, an input apparatus 1340 and an output apparatus 1350.

The processor 1310, the storage apparatus 1320, the communication apparatus 1330, the input apparatus 1340 and the output apparatus 1350 in the second communication node may be connected via a bus or other means, with connection via a bus as an example in FIG. 13.

The input apparatus 1340 may be configured to receive input digital or character information and to generate key signal input related to user settings and function control of the second communication node. The output apparatus 1350 may include a display screen and other display devices.

The communication apparatus 1330 may include a receiver and a transmitter. The communication apparatus 1330 is configured to perform information transceiving and communication under the control of the processor 1310. For example, reception of first timing advance information and corresponding first preamble information is performed.

As a computer-readable storage medium, the storage apparatus 1320 may be configured to store software programs, computer-executable programs and modules, such as program instructions/modules (for example, the reception module 910 and the access module 920 in the random access device or the reception module 1110 and the access module 1120 in the random access device) corresponding to the method of the embodiments of the present application. The storage apparatus 1320 may include a program storage area and a data storage area. The program storage area may store an operating system and an application program required by at least one function. The data storage area may store data created depending on use of the second communication node. Additionally, the storage apparatus 1320 may include a high-speed random-access memory and may further include a nonvolatile memory, such as at least one magnetic disk memory, a flash memory or another nonvolatile solid-state memory. In some examples, the storage apparatus 1320 may include memories which are remotely disposed with respect to the processor 1310. These remote memories may be connected to the second communication node via a network. Examples of the preceding network include, but are not limited to, the Internet, an intranet, a local area network, a mobile communication network and a combination thereof.

An embodiment of the present application further provides a storage medium. The storage medium is configured to store a computer program which, when executed by a processor, implements the random access method or downlink message sending method of any embodiment of the present application, such as the random access method applied to a first communication node or a second communication node.

The random access method applied to the first communication node includes the following. First timing advance information and corresponding first preamble information are sent to a second communication node.

The random access method applied to the second communication node includes the following. First timing advance information and corresponding first preamble information which are sent by the first communication node are received. The random access of a third communication node is completed based on the first timing advance information and the first preamble information.

The random access method applied to the first communication node includes the following. In a case where a Message3 is detected, the Message3 is sent to the second communication node through an uplink channel, where scheduling information of the uplink channel is carried in a Message2 or is sent through a downlink channel.

The random access method applied to the second communication node includes the following. A Message3 sent by the first communication node is received. The random access of a third communication node is completed based on the Message3.

The downlink message sending method includes the following. In a case of detecting a downlink message sent by the second communication node and the downlink message satisfying a third condition, the downlink message is sent to a third communication node.

The preceding is only exemplary embodiments of the present application and is not intended to limit the scope of the present application.

It is to be understood by those skilled in the art that the term user device encompasses any appropriate type of radio user device, such as a mobile phone, a portable data processing apparatus, a portable web browser or a vehicle-mounted mobile station.

In general, multiple embodiments of the present application may be implemented in hardware, a special-purpose circuit, software, logic or any combination thereof. For example, some aspects may be implemented in hardware while other aspects may be implemented in firmware or software that may be executed by a controller, a microprocessor or other computing apparatuses, though the present application is not limited thereto.

The embodiments of the present application may be implemented by computer program instructions executed by a data processor of a mobile apparatus, for example, in a processor entity, by hardware or by a combination of software and hardware. The computer program instructions may be assembly instructions, Instruction Set Architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for the local technical environment and may be implemented using any suitable data storage technology, such as, but not limited to, a Read-Only Memory (ROM), a Random-Access Memory (RAM) and an optical memory device and system (a Digital Video Disc (DVD) or a Compact Disc (CD)). Computer-readable media may include non-transitory storage media. The data processor may be of any type suitable for the local technical environment, such as, but not limited to, a general-purpose computer, a special-purpose computer, a microprocessor, a Digital Signal Processor (DSP), an Application-Specific Integrated Circuit (ASIC), a Field-Programmable Gate Array (FPGA) and a processor based on a multi-core processor architecture.

What is claimed is:

1. A random access method, the method being applied to a first communication node and comprising:
   sending first timing advance information and first preamble information corresponding to the first timing advance information to a second communication node;
   wherein the method further comprises: detecting a Message2 sent by the second communication node, wherein the Message2 comprises second timing advance information and second preamble information corresponding to the second timing advance information; and
   in a case where the Message2 satisfies a first condition, detecting a Message3 sent by a third communication node according to scheduling information of the Message3 indicated by first uplink grant information corresponding to the second preamble information, wherein the first condition comprises at least one of the following:
   the second preamble information is the same as the first preamble information; or
   the second timing advance information is the same as the first timing advance information.

2. The method according to claim 1, wherein the first preamble information comprises at least one of:
   index information of a preamble; or
   time frequency resource information of a random access channel occupied by a preamble.

3. The method according to claim 1, further comprising:
   in a case where the Message3 is detected, sending acknowledgement information or uplink resource request information to the second communication node.

4. The method according to claim 3, further comprising:
   receiving second uplink grant information carried in a downlink control channel sent by the second communication node; and
   sending the Message3 to the second communication node according to an uplink resource indicated by the second uplink grant information.

5. The method according to claim 4, further comprising one of following operations:
   receiving acknowledgement information sent by the second communication node; or detecting a downlink control channel carrying downlink grant information.

6. The method according to claim 1, further comprising:
   receiving third uplink grant information carried in a downlink control channel sent by the second communication node, wherein the third uplink grant information comprises scheduling information about retransmission of the Message3 of the third communication node.

7. The method according to claim 6, wherein the downlink control channel further carries second indication information, and the second indication information is indication information for indicating detecting the Message3 sent by the third communication node on a resource indicated by the third uplink grant information.

8. The method according to claim 1, further comprising:
   in a case where the Message3 is detected, sending the Message3 to the second communication node through an uplink channel, wherein scheduling information of the uplink channel is carried in the Message2 or is sent through a downlink channel.

9. The method according to claim 1, further comprising:
   in a case where the Message3 is not detected, sending first indication information to the second communication node, wherein the first indication information indicates at least one of:

negative-acknowledgement indication information; or
retransmission indication information of the Message3.

10. The method according to claim 9, further comprising:
detecting a downlink control channel; and
in a case where a scrambled radio network temporary identifier (RNTI) used by downlink control information carried in the downlink control channel is a temporary cell-radio network temporary identifier (TC-RNTI), detecting the Message3 sent by the third communication node on a resource indicated by fourth uplink grant information in the downlink control information, wherein the TC-RNTI is an RNTI configured in a random access response corresponding to the second preamble information in the Message2.

11. A first communication node, comprising:
at least one processor; and
a storage apparatus configured to store at least one program;
wherein the at least one program is executed by the at least one processor to cause the at least one processor to implement the following:
sending first timing advance information and first preamble information corresponding to the first timing advance information to a second communication node;
detecting a Message2 sent by the second communication node, wherein the Message2 comprises second timing advance information and second preamble information corresponding to the second timing advance information; and
in a case where the Message2 satisfies a first condition, detecting a Message3 sent by a third communication node according to scheduling information of the Message3 indicated by first uplink grant information corresponding to the second preamble information, wherein the first condition comprises at least one of the following:
the second preamble information is the same as the first preamble information; or the second timing advance information is the same as the first timing advance information.

12. A non-transitory storage medium storing computer programs which, when executed by a processor, implement a random access method, wherein the random access method comprises:
sending first timing advance information and first preamble information corresponding to the first timing advance information to a second communication node;
detecting a Message2 sent by the second communication node, wherein the Message2 comprises second timing advance information and second preamble information corresponding to the second timing advance information; and
in a case where the Message2 satisfies a first condition, detecting a Message3 sent by a third communication node according to scheduling information of the Message3 indicated by first uplink grant information corresponding to the second preamble information, wherein the first condition comprises at least one of the following:
the second preamble information is the same as the first preamble information; or the second timing advance information is the same as the first timing advance information.

* * * * *